June 29, 1965 E. U. SOWERS III 3,191,858

KEYPUNCH INPUT WITH REPEAT READOUT INCORPORATING
FLUID AMPLIFYING MEANS
Filed June 5, 1963

INVENTOR.
EDWIN U. SOWERS III
BY Griffin and Stokes
ATTORNEYS

United States Patent Office 3,191,858

Patented June 29, 1965

3,191,858

KEYPUNCH INPUT WITH REPEAT READOUT INCORPORATING FLUID AMPLIFYING MEANS

Edwin U. Sowers III, Adelphi, Md., assignor to Sperry Rand Corporation, New York, N.Y., a corporation of Delaware Filed June 5, 1963, Ser. No. 285,760
14 Claims. (Cl. 234—55)

The present invention relates to data storage devices with novel means for repeatedly reading out stored data. More particularly, the present invention provides pure fluid-operated memory elements in combination with data input means for storing data therein and pure fluid-operated readout means for repeatedly reading out the stored data.

The present invention is particularly suited for use in keypunch devices for punching holes in record cards where the same data must be punched in two or more successive columns of a card. For example, an accounting procedure may require that data be recorded in a series of punched cards with some of this data being the same in each card. In prior art fluid operated keyboard input devices such as those shown in U.S. Patents 3,005,533 and 3,034,628 it is customary to operate the keys representing the data to be punched to thus set a series of bistable memory elements with all of the memory elements being reset as soon as the data stored therein is punched. Thus, each card requires a completely new keyboard set-up even though it may be necessary to punch the same data in two or more consecutive cards.

Accordingly, an object of the present invention is to provide a data recording device including a series of fluid-operated bistable memory elements, and means for repeatedly reading out the data stored in the bistable elements whereby data may be recorded in a plurality of record cards in response to a single set-up of the memory elements.

An object of this invention is to provide a fluid-operated bistable memory element, data input means for storing data in said memory element, and means for repeatedly reading out the data stored in said memory element whereby said data may be recorded a plurality of times in response to a single actuation of said data input means.

A further object of the invention is to provide a bistable memory element having a power stream input channel, first and second output channels, and first and second control signal input channels for selectively switching said power stream to said first or said second output channel; selectively operable keyboard means for applying fluid control signals to said control signal input channels; a further fluid amplifier having a power stream input channel, first and second output channels, and a control signal input channel connected to said bistable amplifier; recording means connected to said further amplifier; and means for repeatedly applying fluid pulses to the power stream input channel of said second amplifier whereby said recording device is repeatedly actuated in response to a single actuation of said keyboard means.

Other objects of the invention and its mode of operation will become apparent upon consideration of the following description and the accompanying drawings in which.

Figure 1:
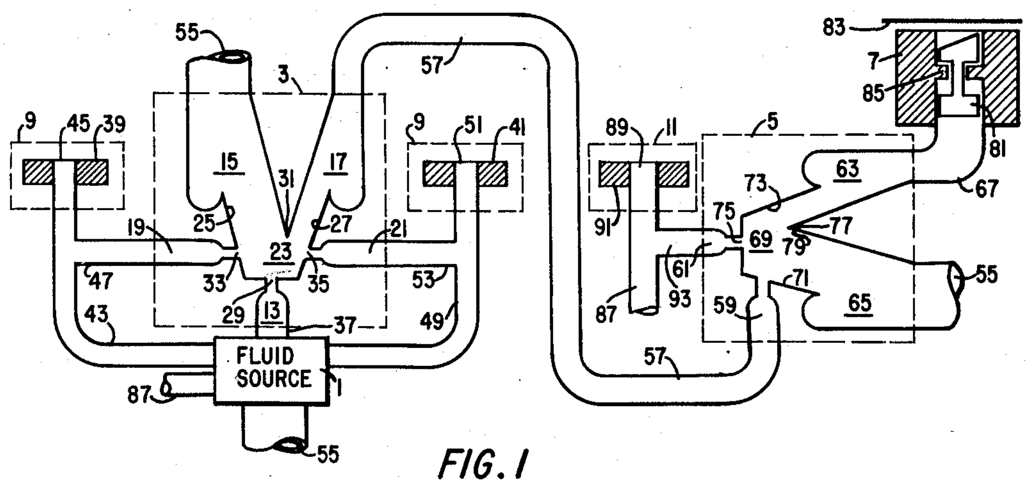
FIGURE 1 shows a simplified embodiment of the invention.

Referring now to FIGURE 1, the invention in its basic form comprises a fluid source 1, a bistable fluid amplifier 3, a further fluid amplifier 5, a recording means 7, a keyboard input means 9, and a readout control means 11.

The fluid amplifiers may be made of plastic, metallic, ceramic or other material. Generally speaking, they may comprise three flat sheets of material. One sheet is etched, stamped, molded or otherwise formed to have the desired configuration of channels. This sheet is then placed between two solid sheets of material and the sheets held tightly together with mechanical fasteners or adhesives. The resulting structure is a substantially solid body having a plurality of channels therein to which air or another gas or water or another liquid may be applied. The above methods are given by way of example only and fluid amplifiers constructed in other ways are equally suitable for use in the present invention.

Bistable fluid amplifier 3 includes a power stream input channel 13, first and second output signal channels 15 and 17, and first and second control signal input channels 19 and 21. The output signal channels intersect at one end to form a chamber 23 with the walls 25 and 27 of the chamber being offset from the edges of orifice 29 through which the power stream enters the chamber. A dividing blade 31 extends into the chamber and is offset from the center line of the orifice 29 so that when a power stream initially enters the chamber 23 as a result of the fluid source 1 being turned on, the entire power stream flows to the left of the dividing blade and into channel 15.

The offset of walls 25 and 27 causes the amplifier to exhibit a bistable characteristic when a substantially constant stream of fluid is applied to channel 13 and control signals are selectively applied to channels 19 and 21.

Assume that walls 25 and 27 are offset from the edges of orifice 29 with wall 27 being offset a greater distance than wall 25. When a stream of fluid is applied to channel 13 it emerges from orifice 29 as a high velocity jet stream, passes through chamber 23, and flows out through output signal channel 15. The high velocity jet stream issuing from orifice 29 creates regions of low pressure adjacent its path of flow by withdrawing molecules of fluid from these regions. If wall 25 is closer than wall 27 to the orifice 29 the power stream withdraws proportionately more molecules of fluid from the region adjacent wall 25 than it does from the region adjacent wall 27. This results in a lower pressure between the wall 25 and the jet stream than between wall 27 and the jet stream. This difference in pressure acts on the jet stream tending to bend it toward wall 25. As the jet stream moves closer to wall 25 it becomes more efficient in withdrawing the molecules of fluid from this region thus creating an even lower pressure therein. Eventually, the jet stream is bent until the low pressure boundary layer causes the jet stream to "lock-on" to the wall 25 and flow out through channel 15. This is a stable state of fluid flow which is self-sustaining as long as the power jet stream continues to flow and no control signal is applied to channel 19. For purposes of the subsequent description this state is designated the "reset" state of the amplifier with output channel 15 being designated the reset output channel. The amplifier is considered to store an indication of a binary zero when the power stream flows through the reset output channel 15.

The power jet stream continues to flow through channel 15 until a fluid control signal representing a binary one is applied to set input channel 19. The application of a fluid signal to channel 19 disrupts the boundary layer adjacent wall 25 and the fluid jet issuing from orifice 33 deflects the power stream toward the wall 27. When the power jet stream has been deflected until it is closer to wall 27 than wall 25, it becomes more efficient in withdrawing molecules of fluid from the region adjacent wall 27. This causes further deflection of the power jet until it locks on to the wall 27 and flows out through output signal channel 17. Because of the boundary layer effect, the power stream remains locked on to the wall 27 even after the control signal applied to channel 19 is terminated so that the power stream continues to flow through channel 17. Channel 17 is designated the set output channel and flow of the power stream through this channel is designated the set state of the amplifier. The set state of the amplifier represents a binary one.

The power stream may be returned to channel 15 and again locked on to wall 25 by application of a fluid signal to reset input channel 21. This signal causes the jet stream to issue from orifice 35 to thereby disrupt the boundary layer adjacent wall 27 and deflect the power stream toward wall 25. As the power stream moves closer to wall 25 it becomes more efficient in withdrawing molecules of fluid from the region adjacent this wall until the power stream eventually locks on to the wall in the manner described above.

The power stream of amplifier 3 is obtained from fluid source 1 which is connected to the power stream input channel 13 by means of a channel 37. Fluid source 1 may be a pump or compressor and preferably includes one or more pressure regulators of conventional design so that a substantially constant stream of fluid is supplied to each of its output channels.

The control signals applied to control signal input channels 19 and 21 may be derived from a keyboard in the manner shown in either of the above mentioned patents. For purposes of illustration, the keyboard input means is shown as a pair of keys 39 and 41 of the type shown in Patent No. 3,034,628. A channel 43 is connected to fluid source 1 and terminates at an orifice 45 in the surface of key 39. A channel 47 is connected to control signal input channel 19 and also connected to channel 43 at a point between the fluid source and orifice 45.

Fluid source 1 continuously applies a stream of fluid to the channel 43 and this fluid is exhausted to the atmosphere through orifice 45. When it is desired to store a binary 1 in amplifier 3 by switching it to the set state, the operator blocks the orifice 45 so that the fluid from source 1 flows through channel 43, channel 47, and control signal input channel 19, and emerges from orifice 33 as a high velocity jet stream. This deflects the power jet of amplifier 3 so that it locks on to wall 27 and flows out through the set output channel 17.

A fluid channel 49 terminates at an orifice 51 in the surface of a key 41. A further channel 53 is connected to control signal input channel 21 and also connected to the channel 49 at a point between source 1 and orifice 51. When it is desired to reset amplifier 3 to thus store an indication of a binary 0, the operator blocks the orifice 51. This causes the fluid flowing through channel 49 to be directed through channels 53 and 21 so that it issues from orifice 35 as a control jet stream. This control jet disrupts the boundary layer adjacent wall 27 and deflects the power stream of amplifier 3 toward the wall 25. As explained above, the power stream locks on to wall 25 and flows through output channel 15 even after the obstruction is removed from orifice 51. Fluid flowing through output channel 15 may be exhausted into the surrounding atmosphere but is preferably fed over a channel 55 to the return side of the fluid source.

Output channel 17 of the bistable amplifier is connected by means of a channel 57 to the control signal input channel 59 of the amplifier 5. Amplifier 5 is not bistable but instead operates on the principle of momentum exchange. In addition to the control signal input channel 59, amplifier 5 includes a power stream input channel 61 and first and second output channels 63 and 65. Channel 65 is connected by means of channel 55 to the return side of the fluid source while channel 63 is connected by means of a channel 67 to the output device 7.

A chamber 69 is formed by the intersection of the channels 63 and 65 with the walls 71 and 73 being offset from the edges of orifice 75 by a distance sufficient to prevent a power stream emerging from the orifice from locking on to either wall as a result of the boundary layer effect. Dividing element 77 is offset from the orifice 75 so that a power stream entering the chamber through orifice 75 normally strikes the dividing element in the region 79 and flows out through channel 65.

Assume that a power stream is applied to power stream input channel 61 but no control signal is applied to control signal input channel 59. The power stream emerges from orifice 75 as a high velocity jet stream, flows through chamber 69, strikes the dividing element 77 in the region 79, and flows out of the amplifier through output channel 65.

Assume now that a control jet stream is emerging from control signal input channel 59 at the time the power stream is applied to channel 61. The momentum of the control jet stream is imparted to the power jet stream when they collide in the chamber 69. This changes the direction of flow of the power jet stream so that it flows into output channel 63 and is applied to the output device 7.

Output device 7 is schematically illustrated as a recorder comprising a punch element 81 mounted in the channel 67 and positioned slightly below the path of travel of a record card 83. When the power stream of amplifier 5 is deflected into channel 63 the pressure in channel 67 increases to drive the punch upward and through the card 83. A stop element 85 limits the upward movement of the punch element. When the power stream of the amplifier ceases flowing into channel 63 the pressure in channel 67 decreases and the punch element is withdrawn from the card and returned to the position shown by any suitable means such as a compression spring (not shown).

A power stream is applied to amplifier 5 only when it is desired to sense the state of bistable amplifier 3 and read out or record an indication of this state. For purposes of illustration the readout control means is shown as comprising a fluid channel connected to fluid source 1 at one end and terminating at the opposite end as an orifice 89 in the surface of a key 91. A channel 93 is connected between power stream input channel 61 and channel 87.

Fluid source 1 continuously applies fluid over the channel 87 and this fluid is exhausted through the orifice 89 in the readout control key 91. When it is desired to record an indication of the state of amplifier 3 the keypunch operator blocks orifice 89 so that the fluid from source 1 is diverted through channels 93 and 61 so that it enters chamber 69 as a high velocity jet stream. If amplifier 3 is set at this time its power stream is flowing through channels 17 and 59 and entering chamber 69 as a high velocity control jet stream which strikes the power jet and deflects it into channel 63. In the manner described above, this causes punch element 81 to punch a hole in the card indicating that amplifier 3 is set. On the other hand, if amplifier 3 is reset so that its power stream is flowing out through channel 15 then the power stream emerging from orifice 75 is not deflected by a control jet so it strikes surface 79 and flows out through channel 65. In this instance the hole is not punched in the card thus indicating that the amplifier 3 is reset.

Amplifier 5 may be designed such that the output signal derived therefrom is of sufficient power to drive the recording means. Alternatively, the output signal in channel 63 may be amplified before being applied to the recording means.

Figure 2:
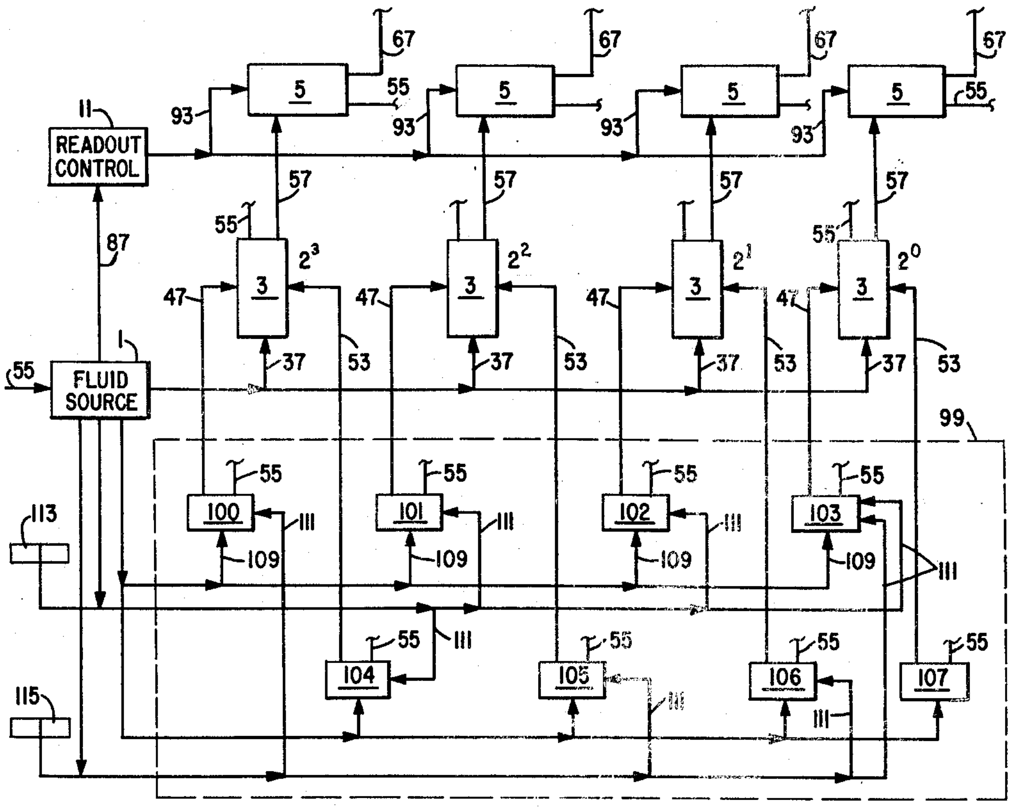
FIGURE 2 is a logic diagram illustrating how the present invention may be adapted for use in recording data in the binary-coded decimal system.

FIGURE 2 illustrates how the present invention may be adapted to repeatedly record a value in binary coded decimal form in response to a single actuation of a key representing a decimal value. This embodiment includes a fluid source 1, a plurality of bistable fluid amplifier memory elements 3, a further plurality of fluid amplifiers 5, and a readout control 11, all connected as described with reference to FIGURE 1. Corresponding elements have been assigned like reference numerals. In addition, this embodiment includes a translator 99 having a plurality of fluid amplifier OR gates 100 through 107.

Amplifiers 100 through 107 are of conventional design and may, for example, receive a continuous power stream from source 1 over a channel 109 and, in response to closure of the orifice in a key, receive a fluid control stream over a channel 111. Each amplifier has a first output channel 55 into which its power stream flows when a control stream is not being received over channel 111 and a second output channel into which its power stream flows when a control stream is received over channel 111. Amplifiers 100 through 103 have their second output channels connected to the channels 47 which apply set signals to the bistable amplifiers 3 while amplifiers 104 through 107 have their second output channels connected to the channels 53 which apply reset signals to the bistable amplifiers.

Ten keys representing the decimal values 0 through 9 are connected in coded-decimal fashion to the OR amplifiers of the translator. Only the key 113 representing the value 7 and the key 115 representing the value 9 are shown, the manner in which the remaining keys are connected being obvious to those familiar with data processing devices.

The decimal value 7 is represented in binary coded decimal form as 0111. Each of the amplifiers 3 stores one of these binary bits of information with the amplifier in stage $2^3$ storing the high order 0 bit and the amplifier in stage $2^0$ storing the low order 1 bit. Key 113 is connected by channels 111 to the control signal input channel of OR amplifiers 101 through 104. Fluid from source 1 is normally exhausted through the orifice in key 113 but when the key is blocked this fluid is diverted through channels 111 to deflect the power streams of OR amplifiers 101 through 104 to their second output channels. Thus, the power stream of OR amplifier 104 flows through channel 53 to reset the bistable amplifier 3 of stage $2^3$ while the power streams of OR amplifiers 101, 102, and 103 flow through channels 47 to set amplifiers 3 in stages $2^2$, $2^1$ and $2^0$.

The power streams of OR amplifiers 101 through 104 return to their normal state and flow into the fluid return channels 55 as soon as the orifice in key 113 is unblocked. However, because of their bistable characteristic each of the amplifiers 3 remains in the state to which it was set to thus store one bit of the coded data. As shown subsequently, these amplifiers retain this bit of data until the orifice of another key is blocked.

The coded value 0111 may be punched in successive cards without again operating key 113. This is accomplished by merely placing each card in punching position and actuating the readout control as described with reference to FIGURE. 1.

A reset key is not required in FIGURE 2, the reset being accomplished by depressing a key to enter the next value. For example, assume that the value 0111 has just been recorded and a new card inserted. The new card is to have the value 1001 recorded in the same column where the previous card had 0111 recorded.

After the new card is inserted in punching position the orifice of key 115 is blocked by the operator. This diverts the fluid from source 1 to the channels 111 of OR amplifiers 100, 103, 105 and 106.

The power stream of amplifier 100 is deflected so that it flows through channel 47 to the set input channel of the bistable amplifier in stage $2^3$. Since this amplifier has been storing a binary 0, the fluid flowing into its control signal input channel switches the amplifier to its set state.

The power stream of amplifier 103 is deflected so that it flows through channel 47 to the set input channel of the bistable amplifier in stage $2^0$. Since this amplifier is already storing a binary 1, the fluid flowing into its control signal input channel does not change the state of the amplifier.

The power stream of amplifier 105 is deflected so that it flows through channel 53 to the reset input channel of the bistable amplifier in stage $2^2$. Since this amplifier has been storing a binary 1, the fluid flowing into its control signal input channel switches the amplifier from its set state to its reset state.

Finally, the power stream of amplifier 106 is deflected so that it flows through channel 53 to the reset input channel of the bistable amplifier in stage $2^1$. Since this amplifier has been storing a binary 1, the fluid flowing into its control signal input channel switches the amplifier from its set state to its reset state.

The orifice in key 115 is now unblocked thus terminating the control signals applied to OR amplifiers 100, 103, 105 and 106. These amplifiers return to their normal state with their power streams flowing into the fluid return channels 55. However, as a result of the signals applied to them from the OR amplifiers, the bistable amplifiers in stages $2^3$ and $2^0$ are set while the bistable amplifiers in stages $2^2$ and $2^1$ are reset. Thus, the bistable amplifiers contain the coded decimal value 1001 and this value may be recorded in each record card inserted in punching position by merely operating the readout control 11 to simultaneously produce power streams in each of the amplifiers 5.

It will be understood that FIGURE 2 shows only those elements necessary for recording one decimal digit in binary coded decimal form. There may be four bistable amplifiers 3 and four further amplifiers 5 for each decimal digit to be converted and stored in the record card. Also, it will be understood that there must be ten keys or other input means and a translator circuit 99 for each set of four bistable amplifiers. A readout control may be provided for a group of four bistable amplifiers. However, in some instances it may be desirable to provide a single readout control 11 for simultaneously pulsing all amplifiers 5. This enables amplifiers 5 to be repeatedly read out simultaneously to thereby record the data stored in amplifiers 3 in consecutive cards. If the data to be recorded in a given card is exactly the same as the data recorded in the preceding card then a single operation of the readout control is sufficient to punch the entire card. If data in certain columns of a given card differs from the data in the corresponding columns of the preceding card, the new data is first stored in the bistable amplifiers by depressing the appropriate keys and then the repeat control is actuated to record the data.

While the fundamental novel features of the invention as applied to preferred embodiments have been shown and described, it will be understood that various modifications in the form and details of the device illustrated may be made without departing from the spirit of the invention. For example, other bistable fluid amplifiers such as those disclosed in Patent No. 3,030,979 may be substituted for the bistable amplifiers shown in the accompanying drawing. Furthermore, those skilled in the art will recognize that the present invention is admirably suited for use in gang punching machines if switches or other automatic means are substituted for the manually operated keys shown herein. It is the intention therefore to be limited only as indicated by the scope of the following claims.

I claim:

1. In a fluid operated recording device of the type wherein record media are moved successively into a recording station and data recorded thereon, the combination comprising: key means for producing a fluid signal representing a bit of data to be recorded; a bistable fluid amplifier responsive to said fluid signal for storing a manifestation of said data bit and continuously producing a fluid output signal manifesting its value; a further fluid amplifier having a power stream input channel, an output channel, and a control signal input channel for receiving the output signal from said bistable fluid amplifier to deflect the power stream of said further fluid amplifier to its output channel; recording means connected to said output channel of said further fluid amplifier and disposed adjacent said recording station; and means for intermittently applying a power stream to the power stream input channel of said further amplifier to actuate said recording means whereby said bit of data may be recorded a plurality of times in response to a single fluid signal from said key means.

2. The combination as claimed in claim 1 wherein said recording means comprises a punch disposed adjacent said recording station and responsive to power stream flow into the output channel of said further amplifier.

3. The combination as claimed in claim 1 wherein said bistable fluid amplifier comprises a power stream input channel, a first output channel for normally receiving an applied power stream, a second output channel, a first control signal input channel responsive to the fluid signal from said key means for switching the power stream to said second output channel to thereby store said data bit, and a second control signal input channel through which a fluid signal may be applied to switch the power stream back to said first output channel.

4. The combination as claimed in claim 3 wherein said further fluid amplifier has a second output channel for receiving the power stream intermittently applied to said further amplifier while the power stream of said bistable amplifier is being received from said first output channel.

5. The combination as claimed in claim 4 and further comprising means for applying a fluid signal to said second control signal input channel after said bit of data has been recorded the desired number of times on said record media.

6. The combination as claimed in claim 5 wherein said recording means comprises a punch disposed adjacent said recording station and responsive to power stream flow into the output channel of said further amplifier.

7. A data recording device comprising: a plurality of bistable fluid amplifiers each having a power stream input channel, set and reset output channels for receiving a power stream applied to the amplifier, and set and reset input channels responsive to fluid signals for selectively deflectiing said power stream to said set and reset output channels, respectively; data input means for selectively applying fluid pulses representing data to selected ones of said set input channels; a further plurality of fluid amplifiers each having a control signal input channel connected to one output channel of a corresponding one of said bistable amplifiers, a power stream input channel, and first and second output channels; a plurality of recording means responsive to flow of a power stream into one of said first and second output channels of a corresponding one of said further fluid amplifiers for recording an indication of the state of the corresponding bistable amplifier; and means for repetitively applying a power stream to the power stream input channels of each of said further amplifiers whereby each recording means repetitively records an indication of one kind if said data input means has set the corresponding bistable amplifier and records an indication of another kind if said data input means has not set the corresponding bistable amplifier.

8. A data recording device as claimed in claim 7 and further comprising means for continuously applying power streams to the power stream input channels of said bistable amplifiers.

9. A data recording device as claimed in claim 8 wherein the set output channel of each bistable amplifier is connected to the control signal input channel of the corresponding further fluid amplifier.

10. A data recording device as claimed in claim 9 wherein each recording means is responsive to power stream flow into the second output channel of the corresponding further amplifier caused by said power stream being deflected by fluid from the corresponding control signal input channel.

11. A data recording device as claimed in claim 10 wherein each of said recording means includes a fluid actuated punch.

12. A data recording device as claimed in claim 7 wherein said data input means includes first key controlled means for each of said bistable amplifiers for selectively applying fluid pulses to the set input channel thereof, and second key controlled means for each of said bistable amplifiers for selectively applying fluid pulses to the reset input channel thereof.

13. The combination comprising: a bistable fluid amplifier having first and second signal input channels through which fluid signals may be applied to selectively switch its power stream between a first and a second stable state; a further amplifier having a control signal input channel connected to said bistable amplifier whereby a power stream flowing in said further amplifier is deflected from a first direction of flow to a second direction of flow by the power stream of said bistable amplifier when in one of its stabl states; output means connected to said further amplifier; means for continuously applying a fluid power stream to said bistable amplifier; means for selectively applying data signals to one of said first and second input channels; and means for repetitively applying a power stream to said further amplifier whereby said output means is repetitively actuated if the last data signal applied to said first and second signal input channels was applied to said first input channel.

14. The combination comprising: a bistable fluid amplifier having a first state and a second state; means responsive to fluid signals representing data for switching said bistable amplifier to a state representing said data; means for intermittently producing a stream of fluid; means including fluid conveying means for intermittently manifesting the state of said bistable amplifier; and means responsive to said bistable fluid amplifier when in said first state for deflecting said stream of fluid into said fluid conveying means whereby said manifesting means manifests the state of said bistable amplifier only when said fluid stream is produced.

References Cited by the Examiner

UNITED STATES PATENTS

| | | | |
|---|---|---|---|
| 3,075,679 | 1/63 | Wadey | 137—81.5 |
| 3,107,850 | 10/63 | Warren et al. | 137—81.5 |
| 3,122,039 | 2/64 | Sowers | 137—81.5 |
| 3,128,039 | 4/64 | Norwood | 137—81.5 |
| 3,128,040 | 4/64 | Norwood | 137—81.5 |

FOREIGN PATENTS 1,278,782 11/61 France.

ANDREW R. JUHASZ, *Primary Examiner.*

J. SPENCER OVERHOLSER, *Examiner.*